(12) United States Patent
Umekawa

(10) Patent No.: US 8,373,824 B2
(45) Date of Patent: Feb. 12, 2013

(54) LIQUID CRYSTAL DISPLAY DEVICE

(75) Inventor: Ichiro Umekawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 135 days.

(21) Appl. No.: 13/002,654

(22) PCT Filed: Apr. 7, 2009

(86) PCT No.: PCT/JP2009/057088
§ 371 (c)(1),
(2), (4) Date: Jan. 5, 2011

(87) PCT Pub. No.: WO2010/004792
PCT Pub. Date: Jan. 14, 2010

(65) Prior Publication Data
US 2011/0109841 A1    May 12, 2011

(30) Foreign Application Priority Data
Jul. 8, 2008 (JP) .................. 2008-177555

(51) Int. Cl.
*G02F 1/1335* (2006.01)
(52) U.S. Cl. .......................................... 349/65; 349/158
(58) Field of Classification Search ............. 349/61–62, 349/64–65, 158; 362/97.1, 97.2, 97.3, 97.4
See application file for complete search history.

(56) References Cited

U.S. PATENT DOCUMENTS

| | | |
|---|---|---|
| 2001/0003504 A1 | 6/2001 | Ishihara et al. |
| 2002/0008805 A1 | 1/2002 | Kawakami et al. |
| 2005/0254258 A1* | 11/2005 | Lee ................ 362/612 |
| 2008/0049446 A1 | 2/2008 | Harbers et al. |
| 2008/0170174 A1* | 7/2008 | Nishiyama ........ 349/62 |
| 2011/0170033 A1 | 7/2011 | Mihotani |

FOREIGN PATENT DOCUMENTS

| | | |
|---|---|---|
| EP | 1 168 051 A1 | 1/2002 |
| EP | 1 209 650 A1 | 5/2002 |
| JP | 2000-250031 A1 | 9/2000 |
| JP | 2001-330830 A | 11/2001 |
| JP | 2007-171459 A | 7/2007 |
| RU | 2 183 864 C2 | 6/2002 |
| WO | 2010/035552 A1 | 4/2010 |

OTHER PUBLICATIONS

Official Communication issued in International Patent Application No. PCT/JP2009/057088, mailed on May 19, 2009.

* cited by examiner

*Primary Examiner* — Uyen Chau N Le
*Assistant Examiner* — Michael Mooney
(74) *Attorney, Agent, or Firm* — Keating & Bennett, LLP

(57) ABSTRACT

An LED (31) is attached to an active matrix substrate (11), and a light emitting surface (31L) of the LED (31) is positioned on an outer substrate surface (11T) side of the active matrix substrate (11).

3 Claims, 12 Drawing Sheets

LIQUID CRYSTAL DISPLAY DEVICE

TECHNICAL FIELD

The present invention relates to a liquid crystal display device.

BACKGROUND ART

In these days, a thin-type display device has become popular. As such a display device, a liquid crystal display device 169 as illustrated in FIGS. 8 to 10 may be exemplified. FIG. 9 is an exploded perspective view of the liquid crystal display device 169. FIG. 10 is a plan view of a liquid crystal display panel 119 and the like included in the liquid crystal display device 169 illustrated in FIG. 9, and FIG. 8 is a cross-sectional view of the liquid crystal display device 169 illustrated in FIG. 9, taken in the direction of the arrows along the line E-E' of FIG. 9.

As illustrated in FIGS. 8 and 9, the liquid crystal display device 169 includes the liquid crystal display panel 119 and a backlight unit 139 for applying light to the liquid crystal display panel 119. Further, as illustrated in FIGS. 8 to 10, on a flexible printed circuit (FPC) board 116 which is attached to the liquid crystal display panel 119, light emitting diodes (LEDs) 131 are mounted, and a light emitting surface 131L of each of the LEDs 131 faces a side surface 132S of a light guide plate 132.

In the liquid crystal display device 169 having such an internal structure, the FPC board 116 is required to be wrapped around the liquid crystal display panel 119 from one surface side to another surface side at a position near an end of the liquid crystal display panel 119. Further, as illustrated in FIG. 11, which illustrates another example of FIG. 8, in some cases, the FPC board 116 may be wrapped around the liquid crystal display panel 119 from one surface side to another surface side so as to surround a built-in frame 170.

In any of the cases illustrated in FIGS. 8 and 11, repulsive force is generated in the FPC board 116 which is bent by the wrapping. As a result, a position of each of the LEDs 131 with respect to the side surface (light receiving surface) 132S of the light guide plate 132 may be displaced from a desired position (in short, positional accuracy of the LEDs 131 may be deteriorated).

Positional displacements of the LEDs (light sources) 131 with respect to the side surface 132S of the light guide plate 132 described above may cause nonuniformity in quantity of light from the backlight unit 139, and accordingly, may cause degradation of display quality of the liquid crystal display device 169.

Therefore, Patent Literature 1 discloses the liquid crystal display device 169 for preventing such troubles. In the liquid crystal display device 169, as illustrated in FIG. 12, a recess 172 for storing a pin 171 formed on the light emitting surface 131L of the LED 131 is formed in the side surface 132S of the light guide plate 132. That is, the pin 171 formed on the LED 131 is fitted into the recess 172 formed in the light guide plate 132, to thereby cause the LED 131 to be incapable of moving with respect to the light guide plate 132.

CITATION LIST

Patent Literature

[PTL 1] JP 2001-330830 A

SUMMARY OF INVENTION

Technical Problem

However, also in the liquid crystal display device 169 described in Patent Literature 1, the FPC board 116 is wrapped around the liquid crystal display panel 119 from one surface side to another surface side at a position near the end of the liquid crystal display panel 119. Therefore, repulsive force is generated in the FPC board 116.

Such repulsive force may cause the LEDs 131 to be displaced, and further may cause the liquid crystal display panel 119 to be displaced. For example, in the case of the liquid crystal display device 169 described in Patent Literature 1, the liquid crystal display panel 119 may be lifted up from the backlight unit 139 due to the repulsive force. When such lift-up phenomenon occurs, the display quality of the liquid crystal display device 169 may be degraded.

The present invention is made in view of the above-mentioned circumstances. Therefore, an object of the present invention is to provide a liquid crystal display device capable of preventing degradation of display quality with a simple internal structure.

Solution to Problem

A liquid crystal display device includes: a liquid crystal display panel including a plurality of sandwich substrates for sandwiching liquid crystal there between; and a backlight unit which is covered with the liquid crystal display panel, the backlight unit including a light guide plate for applying light with respect to the liquid crystal display panel.

Further, in the liquid crystal display panel, when a sandwich substrate nearest to the light guide plate is defined as a first sandwich substrate, and, out of substrate surfaces of the first sandwich substrate, a substrate surface facing the light guide plate is defined as an outer substrate surface, in the liquid crystal display device, a light source for supplying the light to the light guide plate is attached to the first sandwich substrate and a light emitting surface of the light source is positioned on the outer substrate surface side.

With this structure, the light source is not attached to a member having flexibility such as, for example, an FPC board, and is directly attached to the first sandwich substrate included in the liquid crystal display panel. Therefore, the FPC board or the like which is dedicated to attachment of the light source is unnecessary, and hence an internal structure of the liquid crystal display device may be simplified. Further, the light source is hardly displaced because the light source is attached to the first sandwich substrate which has no flexibility. Therefore, degradation of display quality of the liquid crystal display device, resulting from displacement of the light source, may be prevented.

Note that, as an example of how to attach the light source to the first sandwich substrate, the light source may be mounted on the outer substrate surface of the first sandwich substrate.

Further, in the case where the light source is attached as described above, the structure is preferred to be as follows. That is, in the liquid crystal display device, it is preferred that, on the outer substrate surface, an electrode of the light source be positioned, on a sandwich substrate surface which is a substrate surface on a rear side of the outer substrate surface, a panel wiring through which a current is allowed to flow be mounted, and in the first sandwich substrate, a through hole for causing the panel wiring to extend from the sandwich substrate surface to the outer substrate surface be formed.

With this structure, the panel wiring extends up to the outer substrate surface via the through hole to be connected to the electrode of the light source. Therefore, even if the light source is not mounted on the FPC board or the like, light emission may be performed.

Further, as another example of how to attach the light source to the first sandwich substrate, a part of the light source may be embedded in an embedding hole which passes through the first sandwich substrate.

Further, in the case where the light source is attached as described above, the structure is preferred to be as follows. That is, in the liquid crystal display device, it is preferred that, on a sandwich substrate surface which is a substrate surface on a rear side of the outer substrate surface, a panel wiring through which a current is allowed to flow be mounted, and an electrode of the light source be formed in the part of the light source which is embedded in the embedding hole and be positioned on the sandwich substrate surface.

With this structure, the electrode of the light source is connected to the panel wiring on the sandwich substrate surface of the first sandwich substrate, and hence, due to a current flowing therethrough, the light source is capable of emitting light.

Advantageous Effects of Invention

According to the present invention, the light source is attached to the first sandwich substrate which does not bend and has high stability. Therefore, another member (such as FPC board) dedicated to attachment of the light source is unnecessary, and hence the internal structure of the liquid crystal display device is simplified.

DESCRIPTION OF EMBODIMENTS

[First Embodiment]

Figure 1:
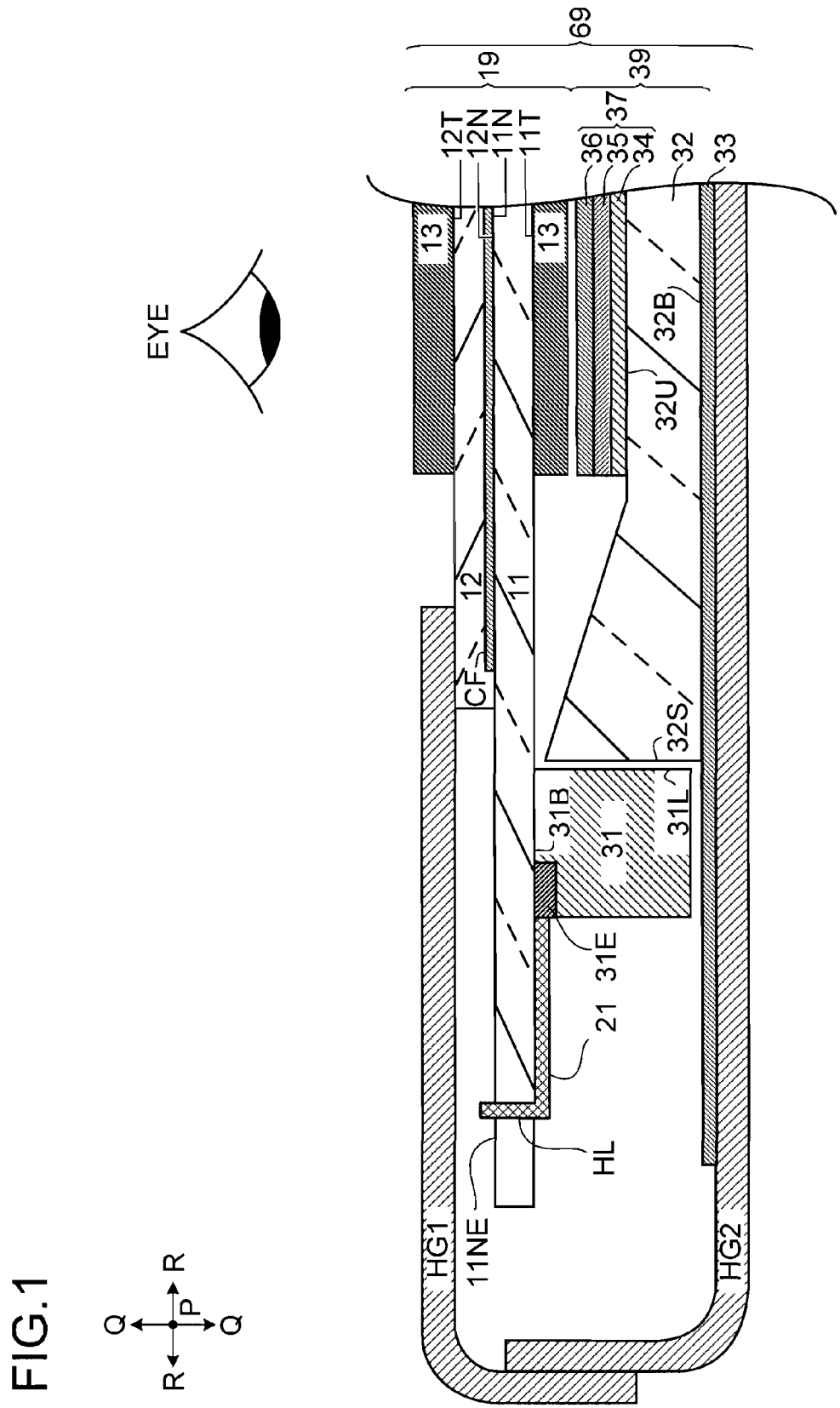
FIG. 1 is a cross-sectional view of a liquid crystal display device illustrated in FIG. 2, taken in the direction of the arrows along the line A-A' of FIG. 2.

An embodiment is described in the following with reference to the drawings. Note that, for the sake of convenience, hatching, reference symbols of members, and the like may be omitted in some cases. In such cases, other drawings are to be referred to. Further, a black dot in the drawings denotes a direction perpendicular to the plane of the sheet.

Figure 2:
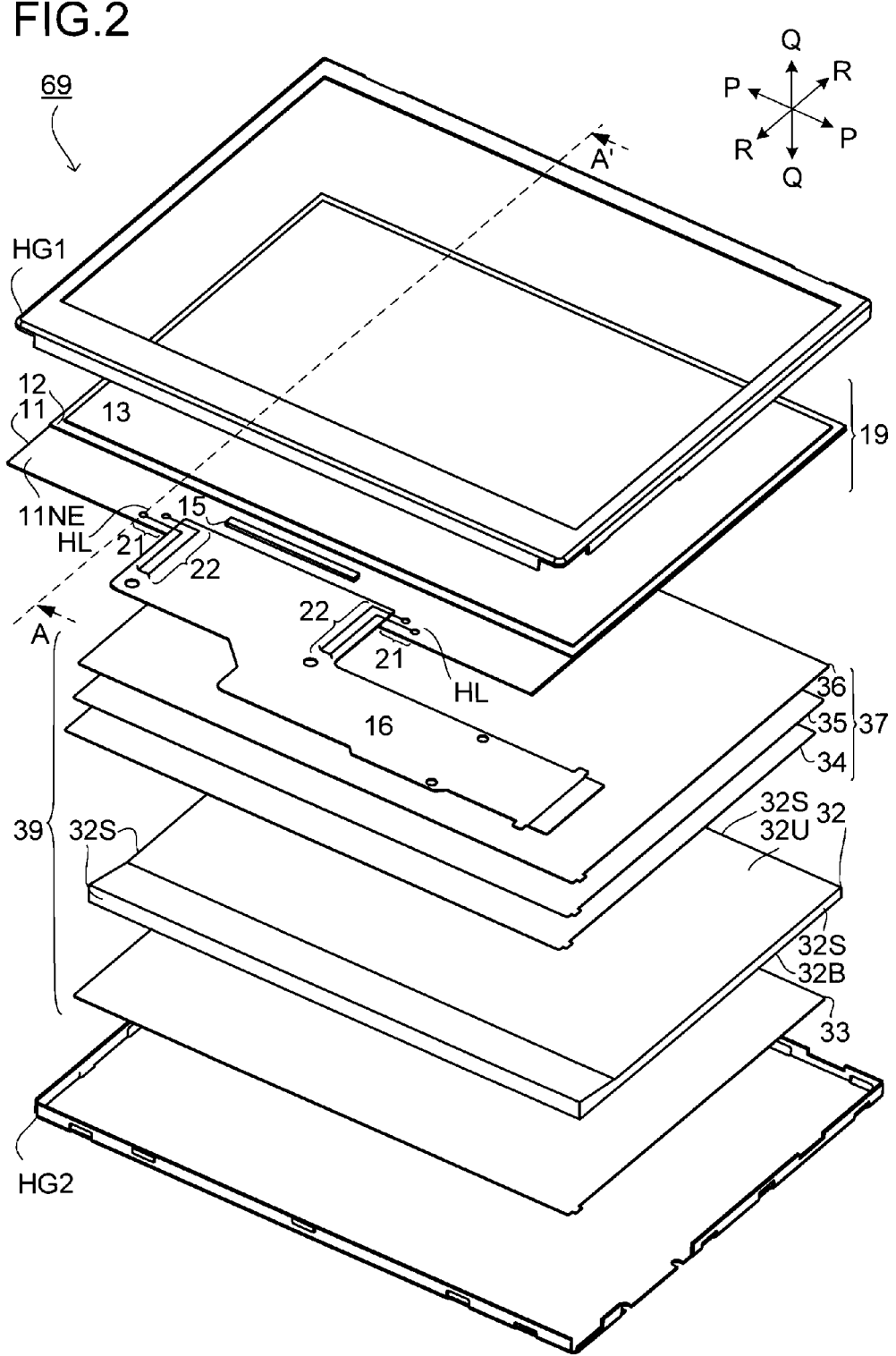
FIG. 2 is an exploded perspective view of the liquid crystal display device.
Figure 3:
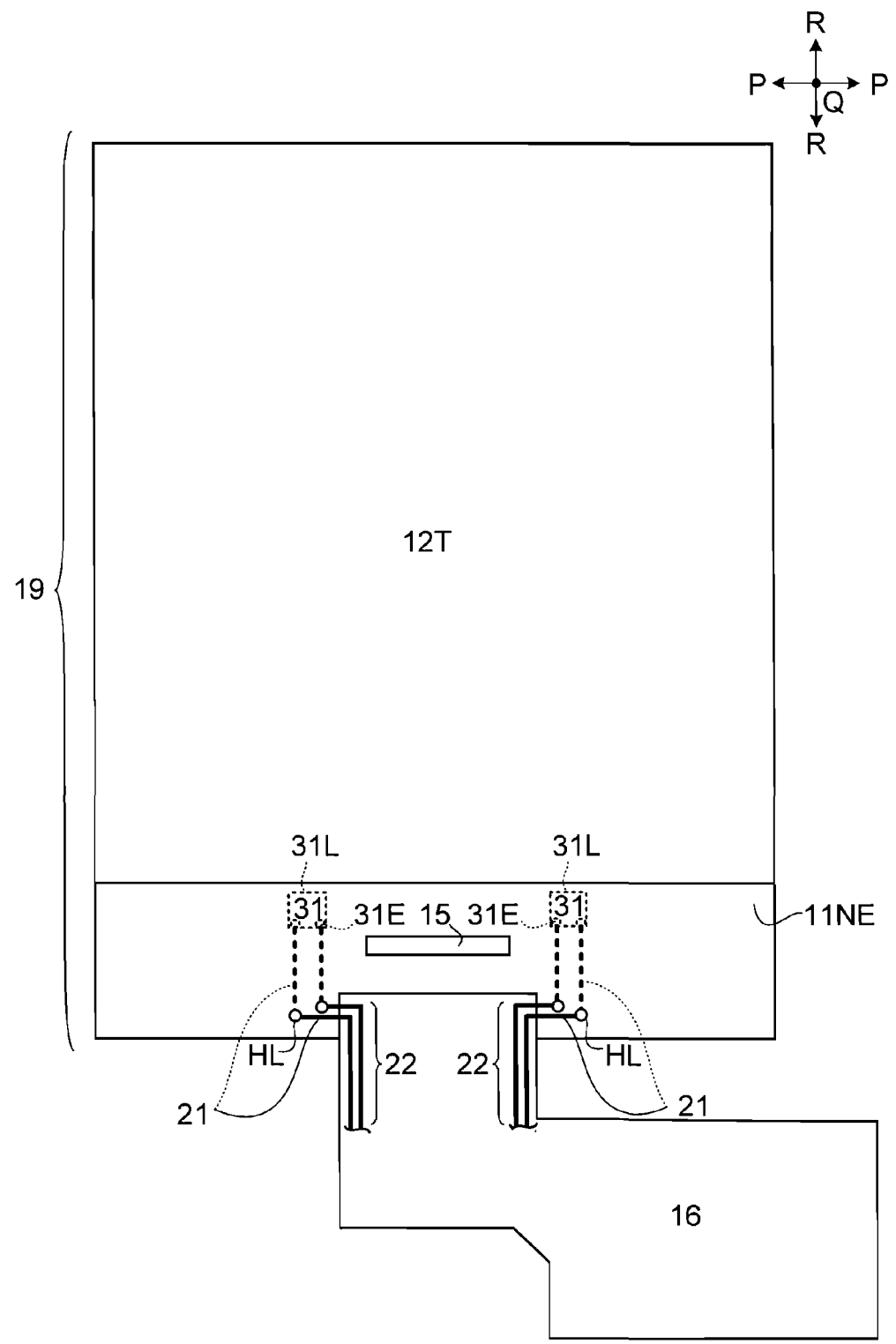
FIG. 3 is a plan view of a liquid crystal display panel and the like included in the liquid crystal display device illustrated in FIG. 2.

FIG. 2 is an exploded perspective view of a liquid crystal display device 69, and FIG. 3 is a plan view of a liquid crystal display panel 19 and the like included in the liquid crystal display device 69 illustrated in FIG. 2. FIG. 1 is a cross-sectional view of the liquid crystal display device 69 illustrated in FIG. 2, taken in the direction of the arrows along the line A-A' of FIG. 2.

As illustrated in FIGS. 1 and 2, the liquid crystal display device 69 includes the liquid crystal display panel 19, a backlight unit 39, and housings HG sandwiching the liquid crystal display panel 19 and the backlight unit 39 there between (note that, a housing HG covering the liquid crystal display panel 19 is referred to as front housing HG1, and a housing HG which supports the backlight unit 39 is referred to as rear housing HG2).

The liquid crystal display panel 19 includes an active matrix substrate 11, a counter substrate 12, and polarizing films 13 and 13 sandwiching the two substrates 11 and 12.

The active matrix substrate (first sandwich substrate) 11 is a substrate including switching elements such as thin film transistors (TFTs) for liquid crystal control (note that, for the sake of convenience, the TFTs are omitted in the drawings).

The counter substrate (second sandwich substrate) 12 is a substrate including a color filter CF for coloring, and is bonded to the active matrix substrate 11 with a sealing material (not shown). Liquid crystal (not shown) is injected into a gap formed between the two substrates 11 and 12.

Note that, substrate surfaces of the two substrates 11 and 12 which are facing each other are referred to as sandwich substrate surfaces 11N and 12N, respectively, and substrate surfaces which are rear surfaces of the sandwich substrate surfaces 11N and 12N are referred to as outer substrate surfaces 11T and 12T, respectively. On an exposed surface 11NE which is a part of the sandwich substrate surface 11N of the active matrix substrate 11 in a portion not covered with the counter substrate 12, a large scale integration (LSI) for liquid crystal drive control 15 is mounted. Note that, in the drawing, only the LSI for liquid crystal drive control 15 is mounted, but the present invention is not limited thereto. For example, in some cases, in addition to the LSI for liquid crystal drive control 15, discrete components such as a capacitor, a resistor, and the like may be mounted. Further, when the LSI for liquid crystal drive control 15 is built into the liquid crystal display panel 19, there may be a case where only discrete components are mounted on the exposed surface 11NE or nothing is mounted thereon.

By the way, in the mounting as described above (so-called chip on glass (COG) mounting), electrical connection is made by an adhesive such as an anisotropic conductive film (ACF) or a solder, but the present invention is not limited thereto (note that, for the sake of convenience, the adhesive is not illustrated).

Further, a flexible printed circuit (FPC) board 16 having flexibility is attached to the exposed surface 11NE of the active matrix substrate 11 via an adhesive. The FPC board 16 and various elements are connected to each other via panel wirings 21 mounted on the exposed surface 11NE (note that, by connecting substrate wirings 22 formed on the FPC board 16 and the panel wirings 21 to each other, respectively, currents are allowed to flow through the various elements via both the wirings 21 and 22).

The polarizing films 13 and 13 are positioned so as to sandwich the two substrates 11 and 12. In this manner, a direction of light entering the liquid crystal display panel 19 and a direction of light exiting the liquid crystal display panel 19 are adjusted.

The liquid crystal display panel 19 described above is a non-emissive display panel of a transmissive type or a transreflective type, and hence a display function is achieved when light (backlight light) from the backlight unit 39 is received. Therefore, if it is possible to uniformly irradiate the entire surface of the liquid crystal display panel 19 with the light from the backlight unit 39, the display quality of the liquid crystal display panel 19 is improved.

The backlight unit 39 which is covered with the liquid crystal display panel 19 includes light emitting diodes (LEDs) 31, a light guide plate 32, a reflection sheet 33, a diffusion sheet 34, and optical sheets 35 and 36.

The LED 31 is a light emitting element (point light source) including an electrode 31E, and emits light after being supplied with a current via the electrode 31E (note that, an attachment position of the LED 31 is described in detail later). Note that, in order to ensure the quantity of light, it is preferred that a plurality of LEDs 31 be mounted in the backlight unit 39. Further, it is preferred that the LEDs 31 be arranged side by side so as to form a line. However, in the drawings, only part of the LEDs are illustrated for the sake of convenience (note that, herein after, a direction of an arrangement of the LEDs 31 is referred to as arrangement direction P).

The light guide plate 32 is a plate-like member having side surfaces 32S, and a top surface 32U and a bottom surface 32B which are positioned so as to sandwich the side surfaces 32S. One of the side surfaces 32S (light receiving surface) faces the light emitting surface 31L of the LED 31, to thereby receive light from the LED 31. The received light is mixed in the light guide plate 32 and is emitted from the top surface 32U to the outside as planar light.

The reflection sheet 33 is positioned so as to be covered with the light guide plate 32. A surface of the reflection sheet 33 which faces the bottom surface 32B of the light guide plate 32 is a reflecting surface. Therefore, the reflecting surface reflects light from the LED 31 and light which propagates through the light guide plate 32 so that the light returns to the light guide plate 32 (more specifically, through the bottom surface 32B of the light guide plate 32) without leakage.

The diffusion sheet 34 is positioned so as to cover the top surface 32U of the light guide plate 32, and diffuses the planar light from the light guide plate 32 so that the light is distributed across the entire liquid crystal display panel 19 (note that, the diffusion sheet 34 and the optical sheets 35 and 36 are also collectively referred to as optical sheet group 37).

The optical sheets 35 and 36 are sheets which have, for example, prism shapes within sheet planes, and which polarize radiation characteristics of light. The optical sheets 35 and 36 are positioned so as to cover the diffusion sheet 34. Therefore, the optical sheets 35 and 36 condense light which travels from the diffusion sheet 34 to improve brightness. Note that, a diffusing direction of light condensed by the optical sheet 35 and a diffusing direction of light condensed by the optical sheet 36 intersect each other.

Note that, the reflection sheet 33, the light guide plate 32, the diffusion sheet 34, and the optical sheets 35 and 36 are stacked in the stated order. Here, a direction in which those members are stacked is referred to as stack direction Q, and a direction perpendicular to both the arrangement direction P of the LEDs 31 and the stack direction Q is referred to as direction R.

Here, the attachment position of the LED 31 is described in detail. Generally, when the liquid crystal display panel 19 is of a transmissive type or a transreflective type, light of the backlight unit 39 is applied from a rear side of the display surface of the liquid crystal display panel 19 which is to be viewed by a user (note that, "EYE" in the drawings indicates a user's eye). That is, the counter substrate 12 of the liquid crystal display panel 19 is a substrate on a side to be viewed by the user, and light from the backlight unit 39 is applied to the active matrix substrate 11 positioned on the rear side of the counter substrate 12.

More specifically, the light from the backlight unit 39 is applied to the outer substrate surface 11T which is a substrate surface of the active matrix substrate 11 not being covered with the counter substrate 12. In short, light enters the active matrix substrate 11, which is nearest to the light guide plate 32 out of the two substrates 11 and 12 included in the liquid crystal display panel 19, from the outer substrate surface 11T facing the light guide plate 32.

Therefore, the top surface (light exiting surface) 32U of the light guide plate 32 in the backlight unit 39 is covered with the active matrix substrate 11 of the liquid crystal display panel 19. Therefore, the side surface 32S of the light guide plate 32 and the outer substrate surface 11T (more specifically, a part of the outer substrate surface 11T which does not overlap the top surface 32U of the light guide plate 32) of the active matrix substrate 11 are caused to come close to each other under a state in which plane directions thereof are intersecting each other.

Here, the LED 31 is attached to (mounted on) the outer substrate surface 11T of the active matrix substrate 11 which has come close to the side surface 32S, under a state in which, with the light emitting surface 31L thereof being positioned on the outer substrate surface 11T side, the light emitting surface 31L faces the side surface 32S of the light guide plate 32.

With this structure, the LED 31 is directly mounted on the active matrix substrate 11, and hence the internal structure of the liquid crystal display device 69 may be simplified (in short, a complicated internal structure is unnecessary to mount the LED 31 in the liquid crystal display device 69).

Moreover, the LED 31 is mounted on the active matrix substrate 11 having high hardness instead of being attached to a member having high flexibility, such as the FPC board 16. Therefore, positional accuracy of the LED 31 is enhanced.

This is described in detail by means of an example. An accuracy of positioning the LED 31, which is mounted on the outer substrate surface 11T of the active matrix substrate 11, at a predetermined position with respect to the side surface 32S of the light guide plate 32 is better than an accuracy of positioning the LED 31, which is mounted on the FPC board 16, at a predetermined position with respect to the side surface 32S of the light guide plate 32.

Further, in the case where the LED 31 is mounted on the FPC board 16 which is connected to the exposed surface 11NE of the active matrix substrate 11, the FPC board 16 is required to be wrapped from the exposed surface 11NE to the outer substrate surface 11T. Then, repulsive force is generated in the FPC board 16 which is bent by the wrapping. As a result, troubles may occur, such as positional displacement of the liquid crystal display panel 19 (lift-up of the liquid crystal display panel 19 from the backlight unit 39). Further, resulting from the repulsive force generated in the FPC board 16, there is also a risk that the LED 31 itself, which is mounted on the FPC board 16, may be displaced with respect to the side surface 32S of the light guide plate 32.

However, in the liquid crystal display device 69 in which the LED 31 is mounted on the outer substrate surface 11T of the active matrix substrate 11 without using the FPC board 16, displacement of the liquid crystal display panel 19 caused by the FPC board 16 does not occur.

Further, in order to prevent those troubles caused by the FPC board 16, it is conceivable to use a FPC board dedicated to mounting of the LED 31 (not shown), which is different from the illustrated FPC board 16. However, when such a measure is taken, two kinds of FPC boards 16 are necessary, which leads to an increase in cost. However, if the LED 31 is mounted on the outer substrate surface 11T of the active matrix substrate 11, such an increase in cost may be avoided.

Note that, through holes HL are formed so that currents flowing through the substrate wirings 22 on the FPC board 16 which are connected to the exposed surface 11NE of the active matrix substrate 11 and through the panel wirings 21 connected to the substrate wirings 22 reach the electrodes 31E of the LEDs 31 mounted on the outer substrate surface 11T of the active matrix substrate 11. That is, the through holes HL are formed so as to pass through the active matrix substrate 11 from the sandwich substrate surface 11N (more specifically, exposed surface 11NE) to the outer substrate surface 11T.

With this structure, each of the panel wirings 21 on the exposed surface 11NE of the active matrix substrate 11 extends up to the outer substrate surface 11T via the through hole HL formed in the exposed surface 11NE, and thus, the panel wiring 21 is connected to the corresponding electrode 31E of the LED 31. Therefore, even if the LEDs 31 are mounted on the active matrix substrate 11, the current flowing through the each of the substrate wirings 22 on the FPC board 16 may be caused to reach the corresponding electrode 31E of the LED 31 via the panel wiring 21, to thereby enable the LED 31 to emit light.

Note that, a technology of forming such through holes HL may be employed for attachment of the LEDs 31 with respect to the active matrix substrate 11. Here, another example related to the attachment of the LEDs 31 is described with reference to FIGS. 4 to 6.

Figure 4:
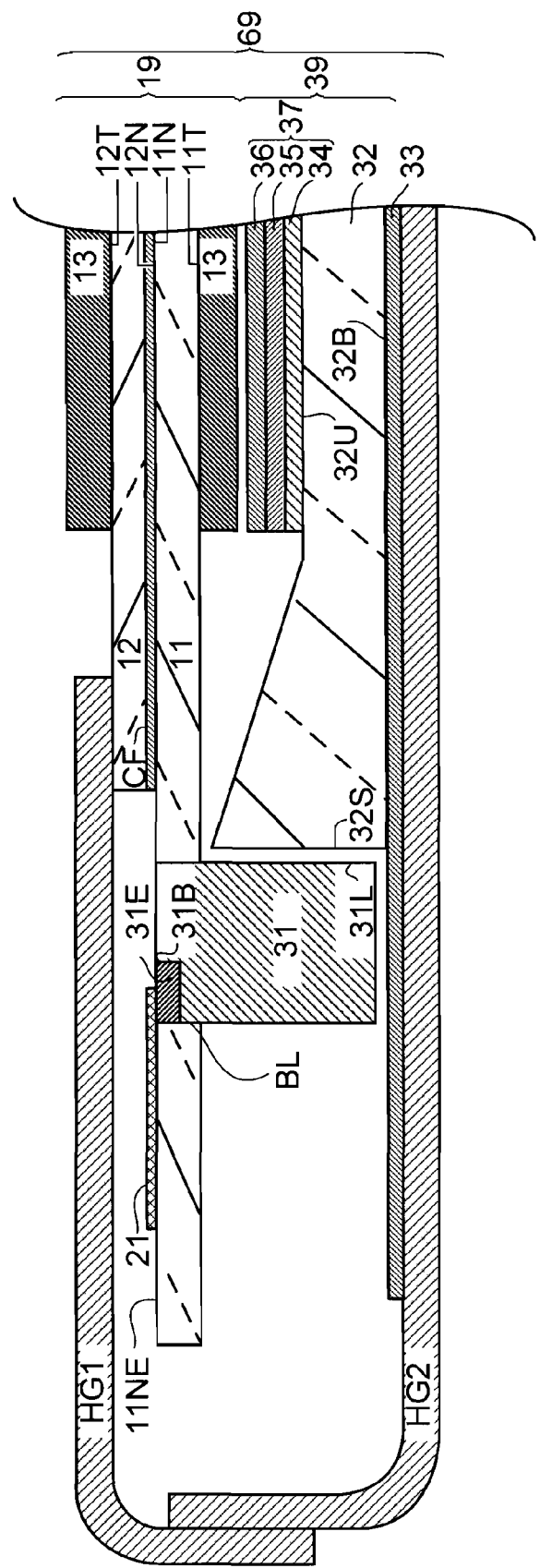
FIG. 4 is a cross-sectional view of a liquid crystal display device illustrated in FIG. 5, taken in the direction of the arrows along the line B-B' of FIG. 5.
Figure 5:
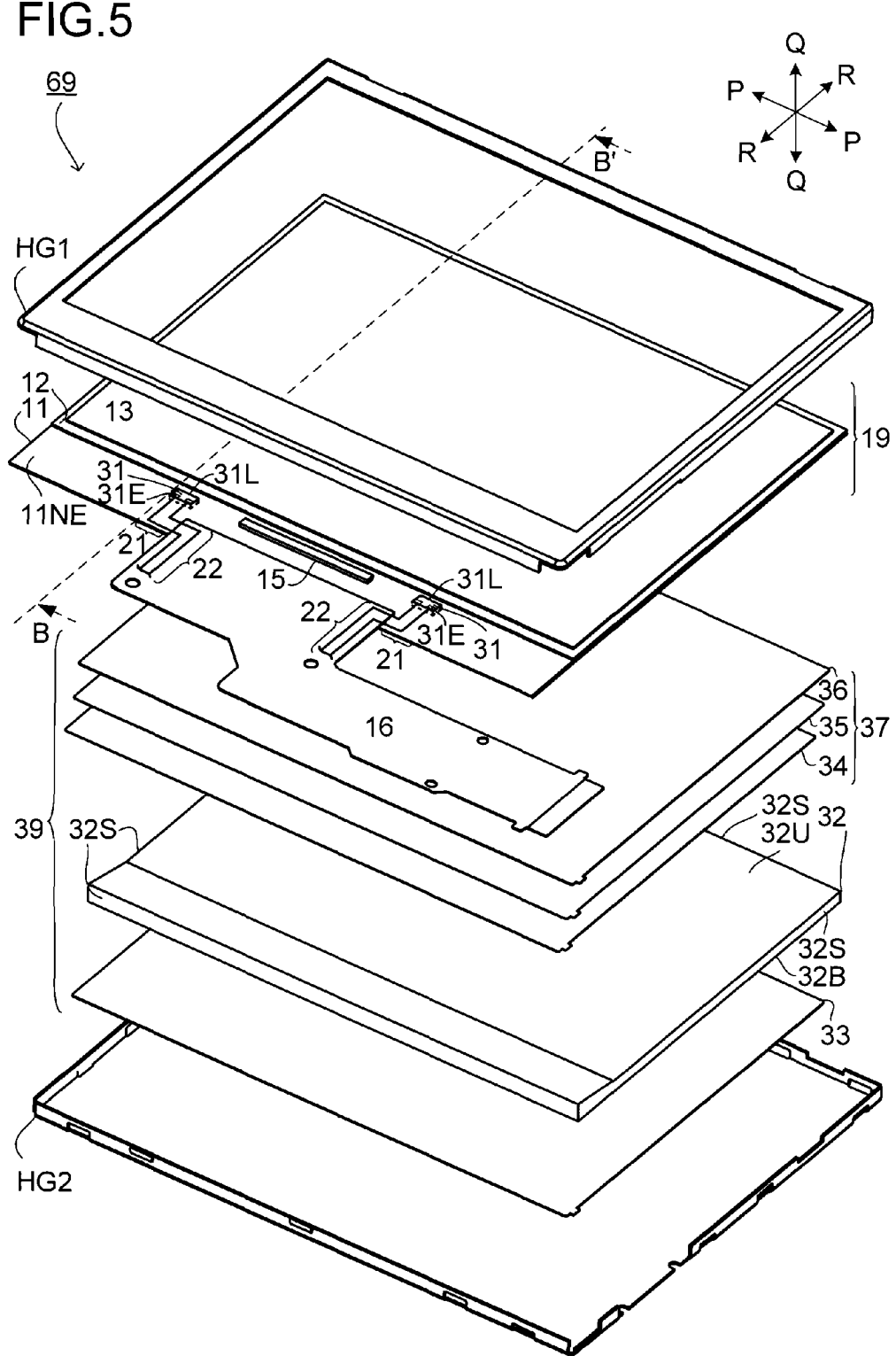
FIG. 5 is an exploded perspective view illustrating another example of the liquid crystal display device illustrated in FIG. 2.
Figure 6:
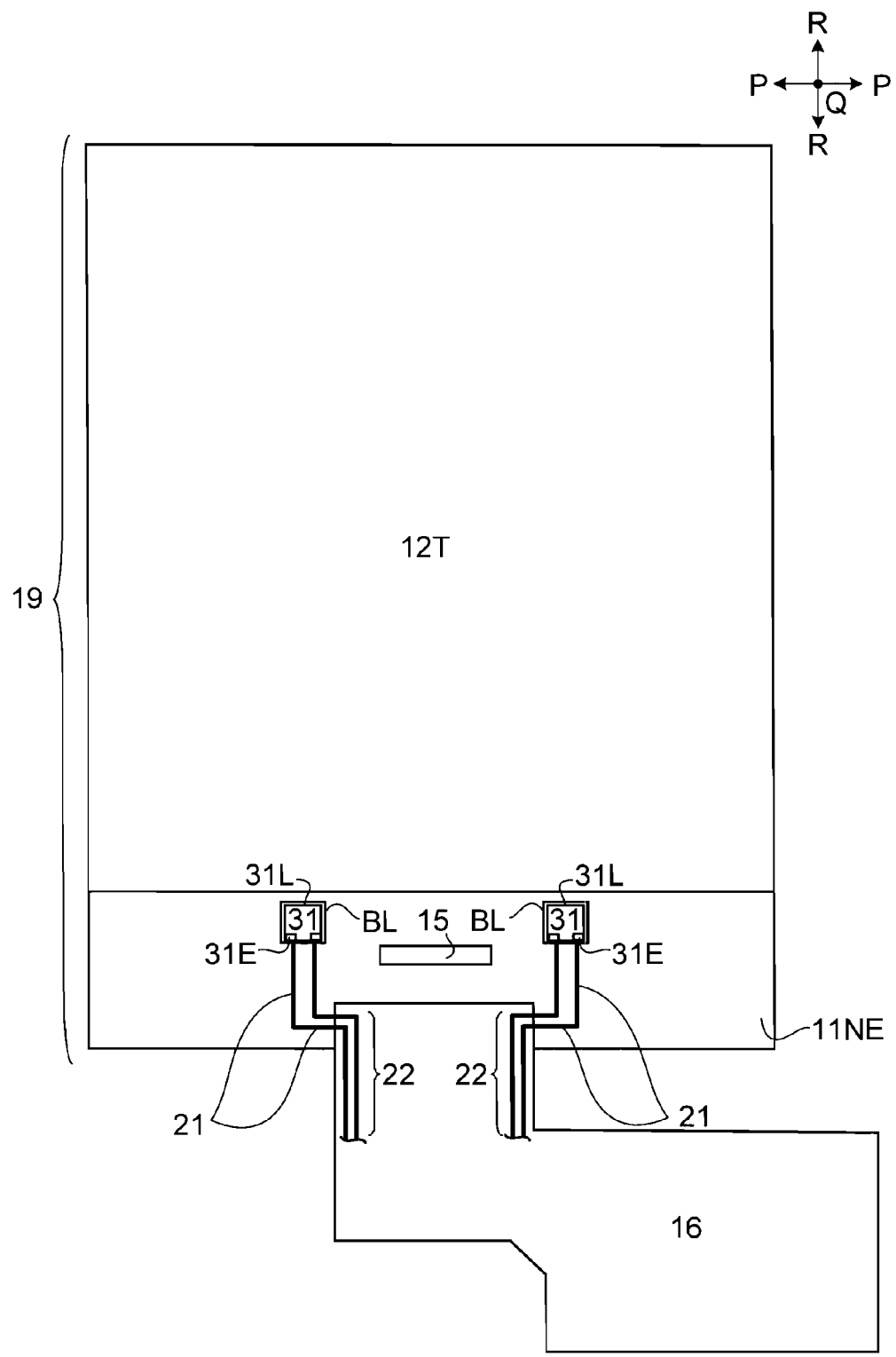
FIG. 6 is a plan view of a liquid crystal display panel and the like included in the liquid crystal display device illustrated in FIG. 5.

FIG. 5 is an exploded perspective view of the liquid crystal display device 69, and FIG. 6 is a plan view of the liquid crystal display panel 19 and the like included in the liquid crystal display device 69 illustrated in FIG. 5. FIG. 4 is a cross-sectional view taken in the direction of the arrows along the line B-B' of FIG. 5.

As illustrated in the drawings, in the active matrix substrate 11, holes (embedding holes) BL which pass through the active matrix substrate 11 from the sandwich substrate surface 11N (more specifically, exposed surface 11NE) to the outer substrate surface 11T are formed. Each of the embedding holes BL is opened to have a hole area capable of housing the LED 31. More specifically, assuming that the light emitting surface 31L is one of the side surfaces of the LED 31, the hole area of the embedding hole BL is larger than an envelopment area surrounding all side surfaces of the LED 31. As a result, the LED 31 is capable of being embedded into the embedding hole BL.

Here, the light emitting surface 31L of the LED 31 faces the side surface (light receiving surface) 32S of the light guide plate 32, and a bottom surface 31B side (in short, a part of the LED 31) is embedded in the embedding hole BL, the bottom surface 31B being a surface other than side surfaces of the LED 31 such as the light emitting surface 31L. Moreover, an adhesive is used to bond the LED 31 with a part thereof being embedded in the embedding hole BL and the active matrix substrate 11.

In this manner, similarly to the liquid crystal display device 69 illustrated in FIGS. 1 to 3, also in the liquid crystal display device 69 illustrated in FIGS. 4 to 6, the LED 31 is attached to the active matrix substrate 11, and the light emitting surface 31L of the LED 31 is positioned on the outer substrate surface 11T side of the active matrix substrate 11. Therefore, even in the liquid crystal display device 69 having such a structure, as described above, simplification of the internal structure of the liquid crystal display device 69, improvement of the positional accuracy of the LED 31, prevention of the positional displacement of the liquid crystal display panel 19, and reduction in cost for the liquid crystal display device 69 may be achieved.

Note that, it is preferred that the electrode 31E of the LED 31 be formed in a part of the LED 31 embedded in the embedding hole BL, for example, on the bottom surface 31B of the LED 31, and be positioned on the sandwich substrate surface 11N. With this structure, the electrode 31E of the LED 31 is connected to the panel wiring 21 on the sandwich substrate surface 11N of the active matrix substrate 11. A current flowing from the substrate wiring 22 which is connected to the panel wiring 21 causes the LED 31 to be capable of emitting light.

[Another Embodiment] Note that, the present invention is not limited to the embodiment described above, and various modifications may be made without departing from a spirit of the present invention.

Figure 7:
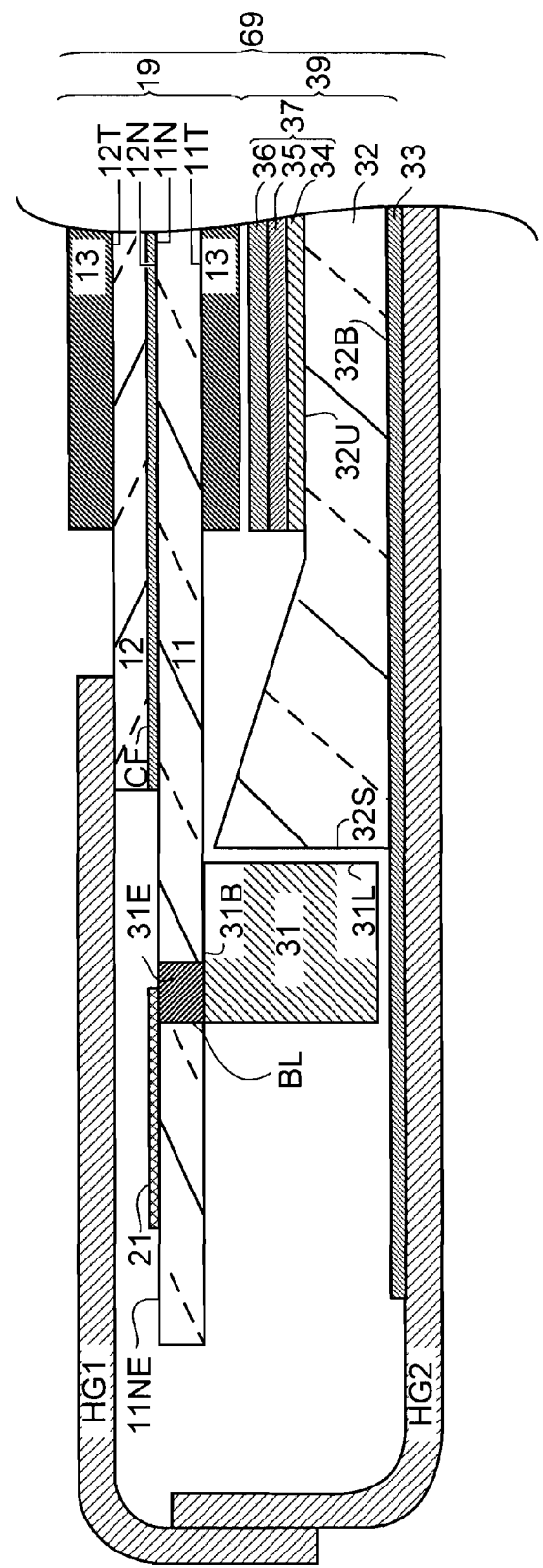
FIG. 7 is a cross-sectional view illustrating another example of the liquid crystal display device illustrated in FIG. 4.
Figure 8:
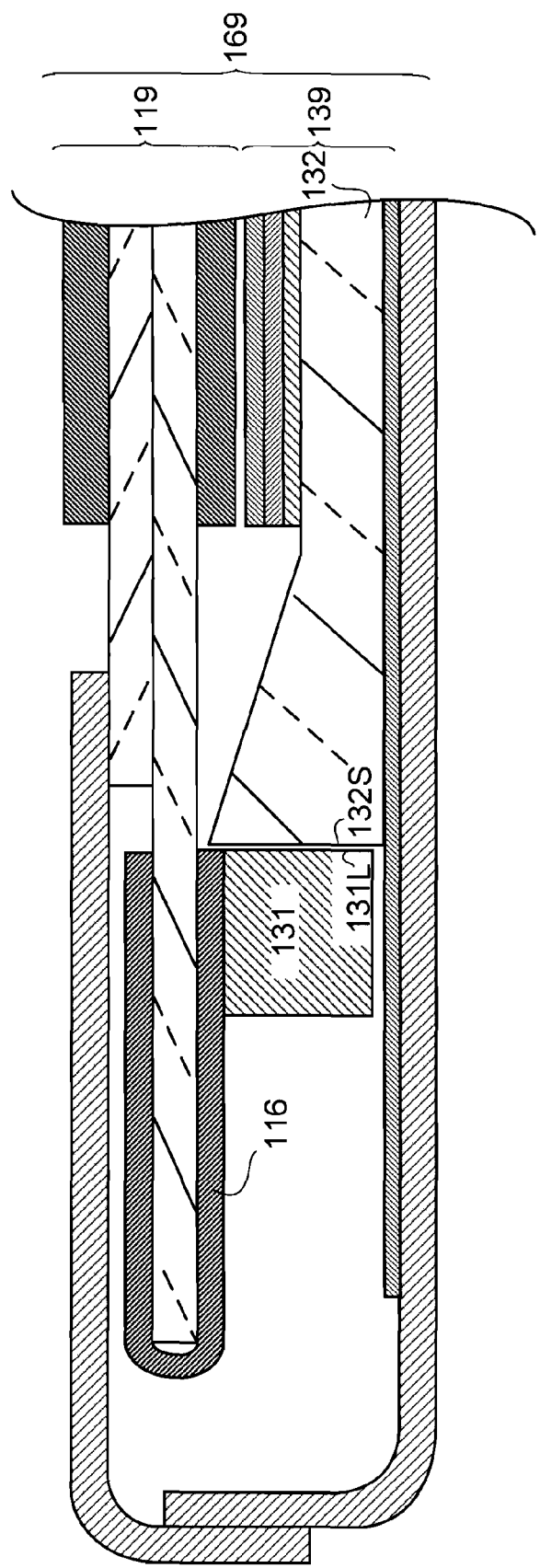
FIG. 8 is a cross-sectional view of a conventional liquid crystal display device illustrated in FIG. 9, taken in the direction of the arrows along the line E-E' of FIG. 9.
Figure 9:
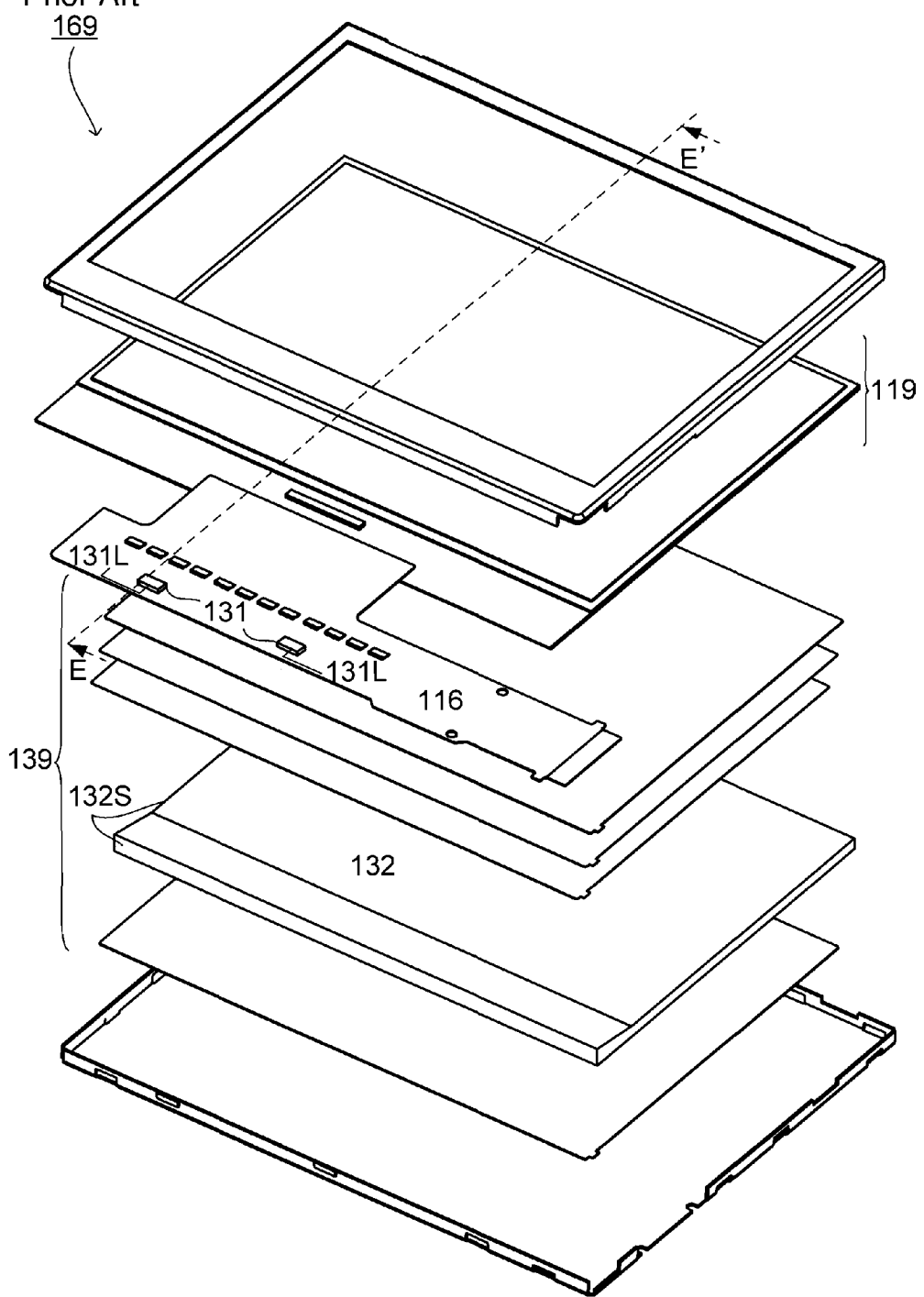
FIG. 9 is an exploded perspective view of the conventional liquid crystal display device.
Figure 10:
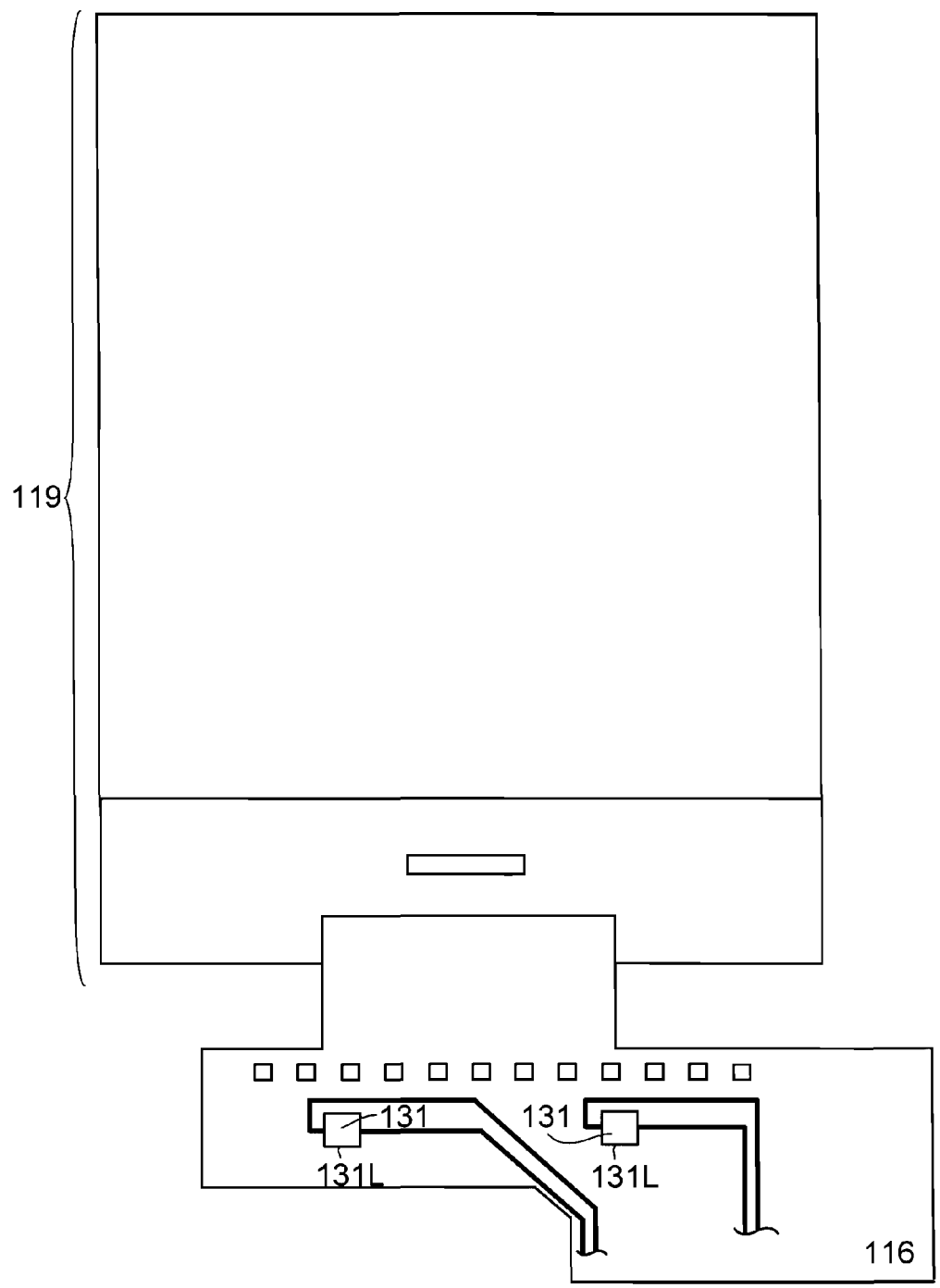
FIG. 10 is a plan view of a liquid crystal display panel and the like included in the conventional liquid crystal display device illustrated in FIG. 9.
Figure 11:
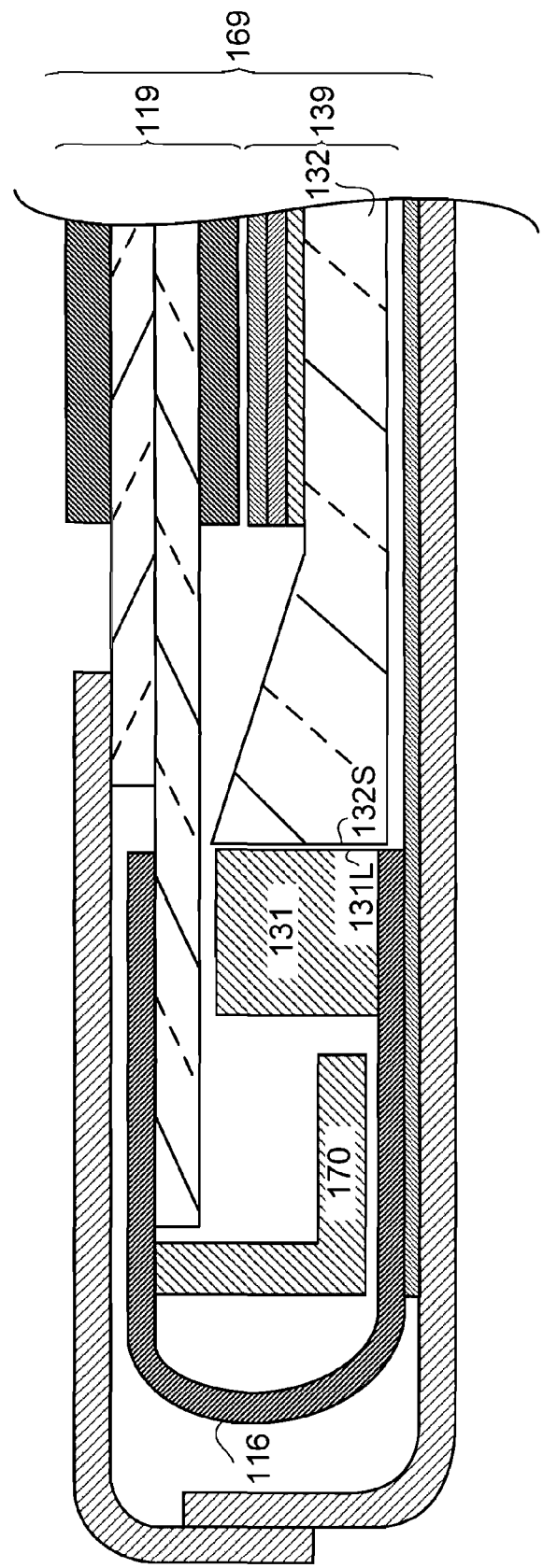
FIG. 11 is a cross-sectional view of another liquid crystal display device different from the conventional liquid crystal display device illustrated in FIG. 8.
Figure 12:
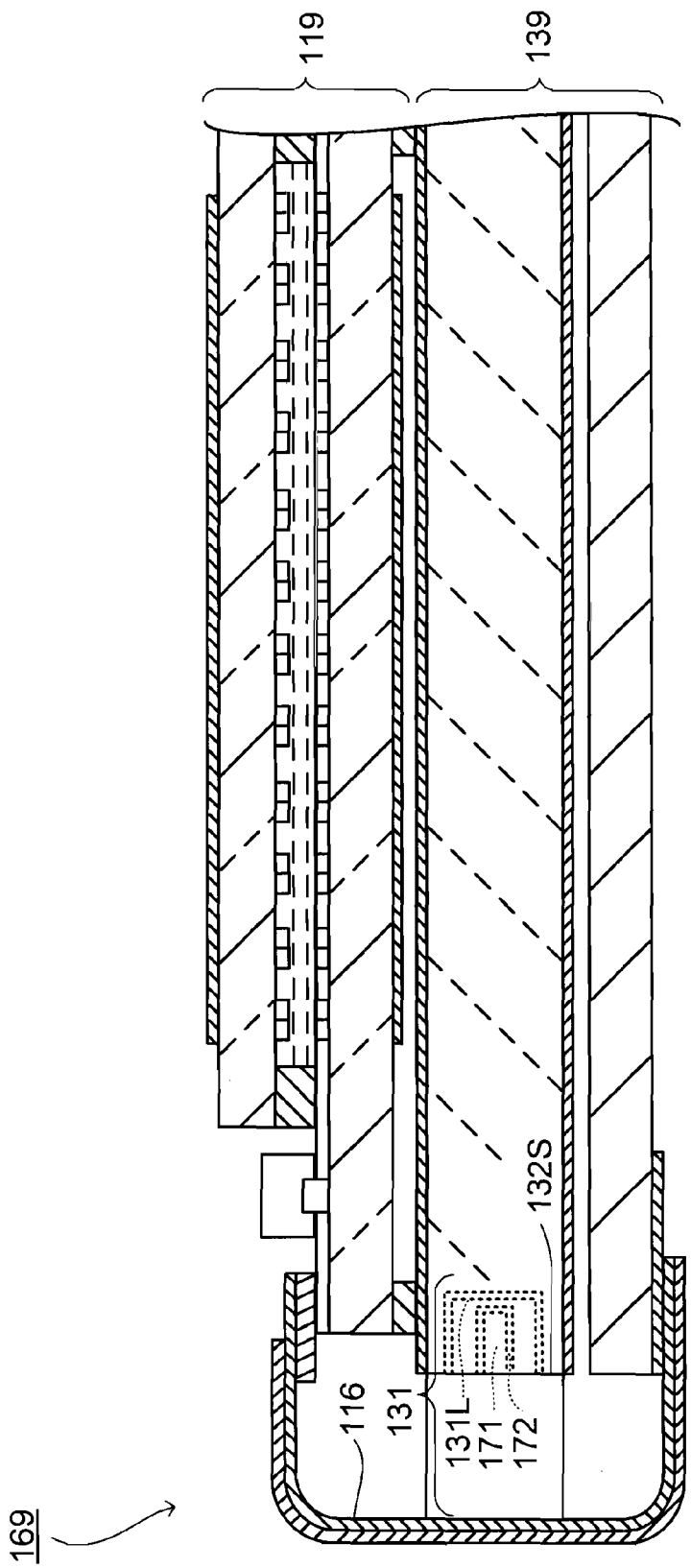
FIG. 12 is a cross-sectional view of still another liquid crystal display device different from the conventional liquid crystal display devices illustrated in FIGS. 8 to 11.

For example, there may be a case in which the embedding hole BL is not required to have such a hole area as to embed the LED 31. For example, as illustrated in FIG. 7 (diagram of another example of FIG. 4), only the electrode 31E formed on the bottom surface 31B of the LED 31 may be embedded in the embedding hole BL, and the light emitting surface 31L of the LED 31 may face the side surface 32S of the light guide plate 32.

Even in this case, the LED 31 is attached to the active matrix substrate 11, and the light emitting surface 31L of the LED 31 is positioned on the outer substrate surface 11T side of the active matrix substrate 11. As a result, even in the liquid crystal display device 69 having such a structure, as described above, simplification of the internal structure of the liquid crystal display device 69, improvement of the positional accuracy of the LED 31, prevention of the positional displacement of the liquid crystal display panel 19, and reduction in cost for the liquid crystal display device 69 may be achieved.

Note that, in the liquid crystal display device 69, the liquid crystal display panel 19 incorporating the active matrix substrate 11 is mounted, but the present invention is not limited thereto. For example, instead of such active type liquid crystal display device 69, there may be used a passive type liquid crystal display device 69 mounting the liquid crystal display panel 19 which incorporates a substrate not including switching elements.

REFERENCE SIGNS LIST 11 active matrix substrate (first sandwich substrate)
11N sandwich substrate surface which is substrate surface of active matrix substrate facing counter substrate
11T outer substrate surface which is substrate surface on rear side of sandwich substrate surface of active matrix substrate
11NE exposed surface which is part of sandwich substrate surface of active matrix substrate
HL through hole
BL embedding hole
12 counter substrate
12N sandwich substrate surface which is substrate surface of counter substrate facing active matrix substrate
12T outer substrate surface which is substrate surface on rear side of sandwich substrate surface of counter substrate
13 polarizing film
15 LSI
16 FPC board
19 liquid crystal display panel
21 panel wiring
22 substrate wiring
31 LED (light source)
31L light emitting surface of LED
31B bottom surface of LED
32 light guide plate
32U top surface of light guide plate
32B bottom surface of light guide plate
32S side surface of light guide plate
39 backlight unit
69 liquid crystal display device

The invention claimed is:

1. A liquid crystal display device, comprising: a liquid crystal display panel including a plurality of sandwich substrates for sandwiching liquid crystal there between; and a backlight unit which is covered with the liquid crystal display panel, the backlight unit including a light guide plate for applying light with respect to the liquid crystal display panel, wherein, in the liquid crystal display panel, when a sandwich substrate nearest to the light guide plate is defined as a first sandwich substrate, and, out of substrate surfaces of the first sandwich substrate, a substrate surface facing the light guide plate is defined as an outer substrate surface, a light source for supplying the light to the light guide plate is attached to the first sandwich substrate and a light emitting surface of the light source is positioned on the outer substrate surface side; wherein the light source is mounted on the outer substrate surface of the first sandwich substrate; and wherein: on the outer substrate surface, an electrode of the light source is positioned; on a sandwich substrate surface which is a substrate surface on a rear side of the outer substrate surface, a panel wiring through which a current is allowed to flow is mounted; and in the first sandwich substrate, a through hole for causing the panel wiring to extend from the sandwich substrate surface to the outer substrate surface is formed.

2. A liquid crystal display device, comprising: a liquid crystal display panel including a plurality of sandwich substrates for sandwiching liquid crystal there between; and a backlight unit which is covered with the liquid crystal display panel, the backlight unit including a light guide plate for applying light with respect to the liquid crystal display panel, wherein, in the liquid crystal display panel, when a sandwich substrate nearest to the light guide plate is defined as a first sandwich substrate, and, out of substrate surfaces of the first sandwich substrate, a substrate surface facing the light guide plate is defined as an outer substrate surface, a light source for supplying the light to the light guide plate is attached to the first sandwich substrate, a light emitting surface of the light source is positioned on the outer substrate surface side, and wherein a part of the light source is embedded in an embedding hole which passes through the first sandwich substrate.

3. A liquid crystal display device according to claim 2, wherein:
   on a sandwich substrate surface which is a substrate surface on a rear side of the outer substrate surface, a panel wiring through which a current is allowed to flow is mounted; and
   an electrode of the light source is formed in the part of the light source which is embedded in the embedding hole and is positioned on the sandwich substrate surface.

* * * * *